Sept. 19, 1967     W. Z. NORTHRUP ET AL     3,342,912

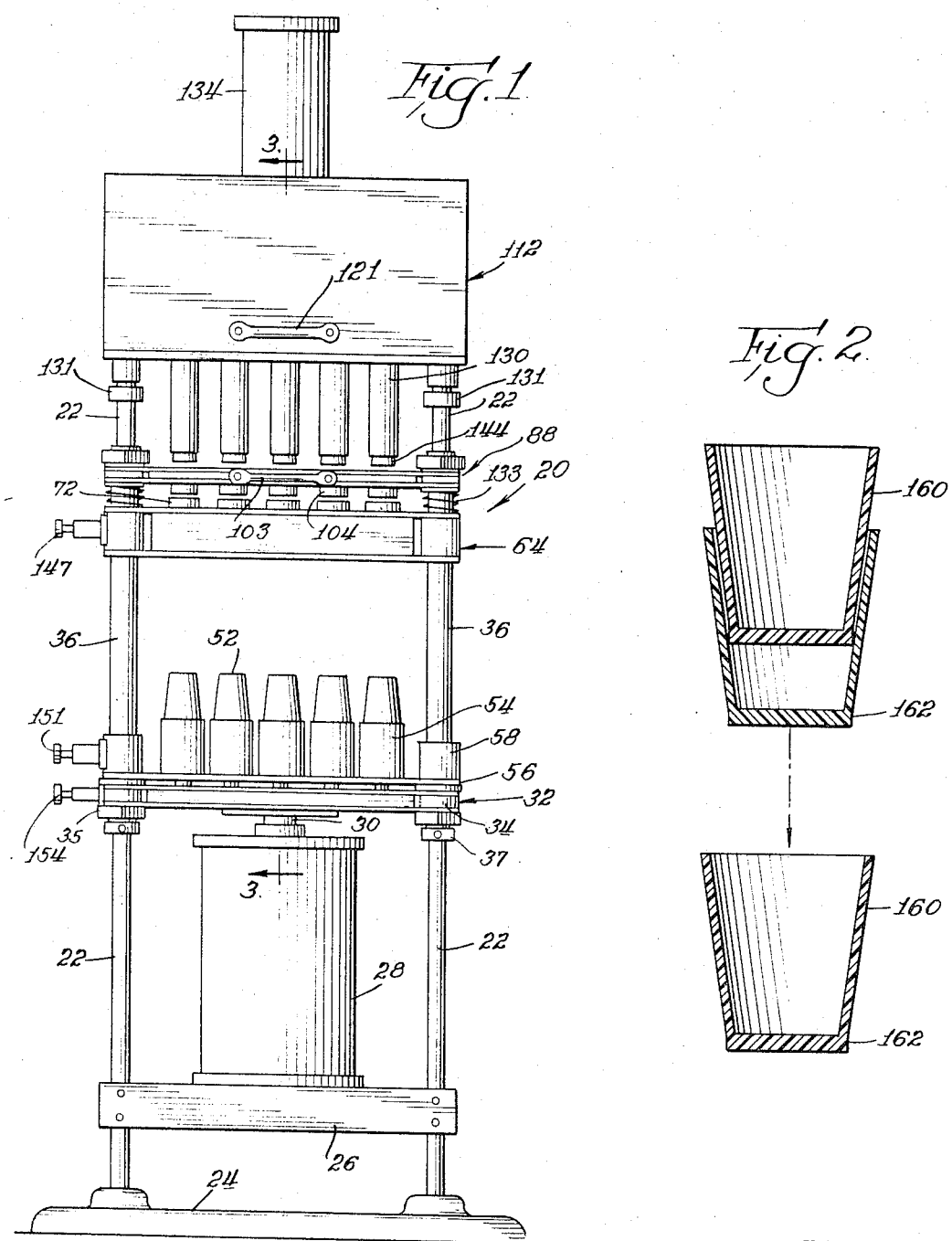

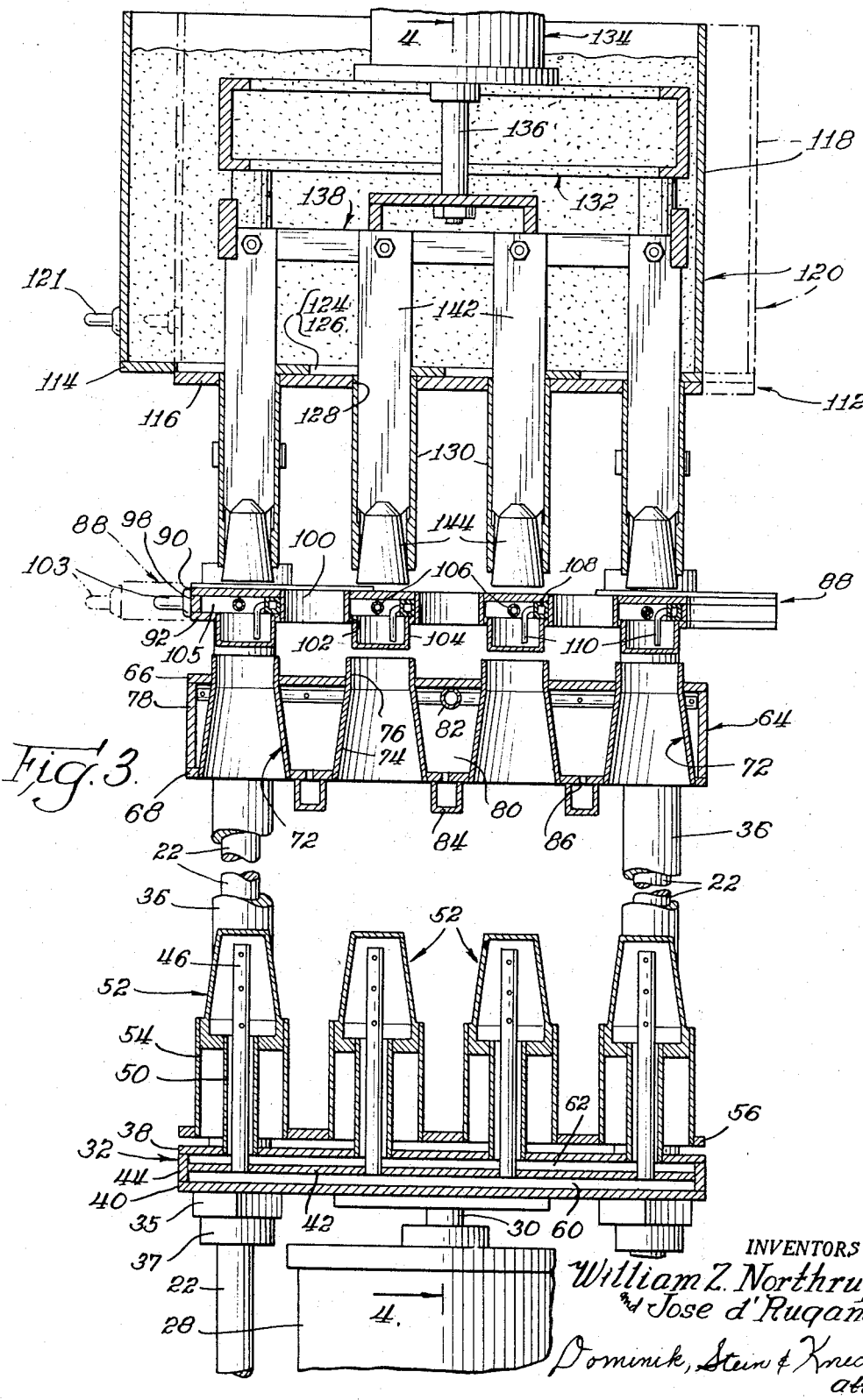

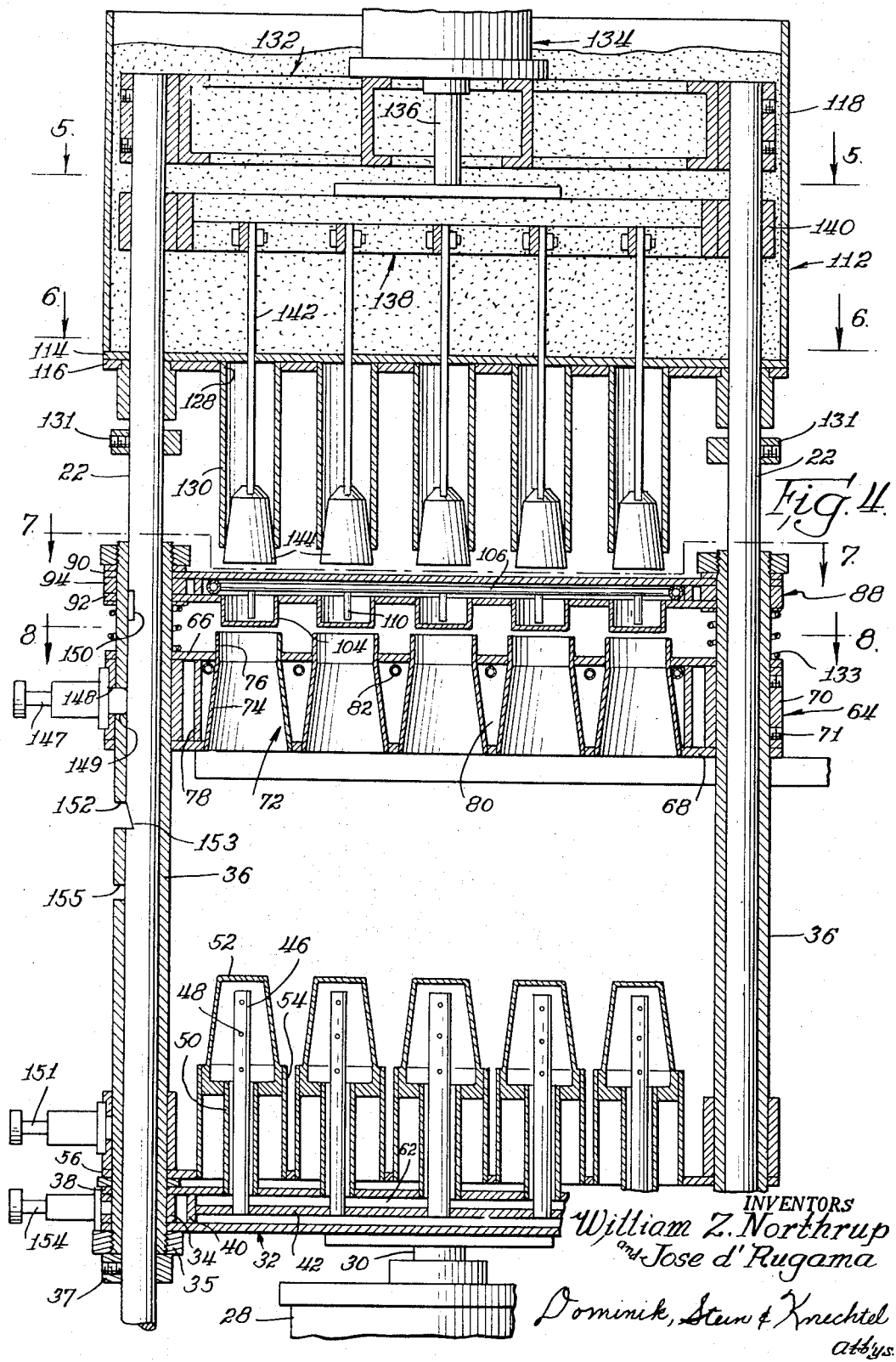

METHOD OF MOLDING PLASTIC CONTAINERS

Original Filed March 13, 1961     9 Sheets-Sheet 4

INVENTORS
William Z. Northrup
and Jose d' Rugama

Dominik, Stein & Knechtel
att'ys.

Sept. 19, 1967     W. Z. NORTHRUP ET AL     3,342,912
METHOD OF MOLDING PLASTIC CONTAINERS
Original Filed March 13, 1961     9 Sheets-Sheet 5
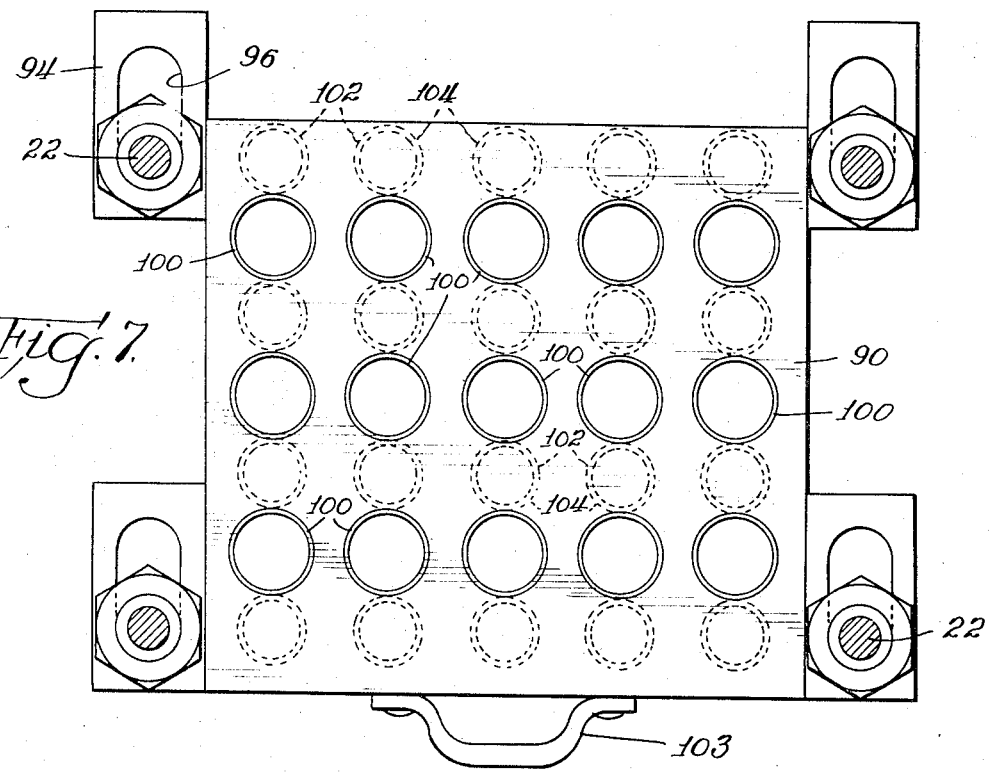
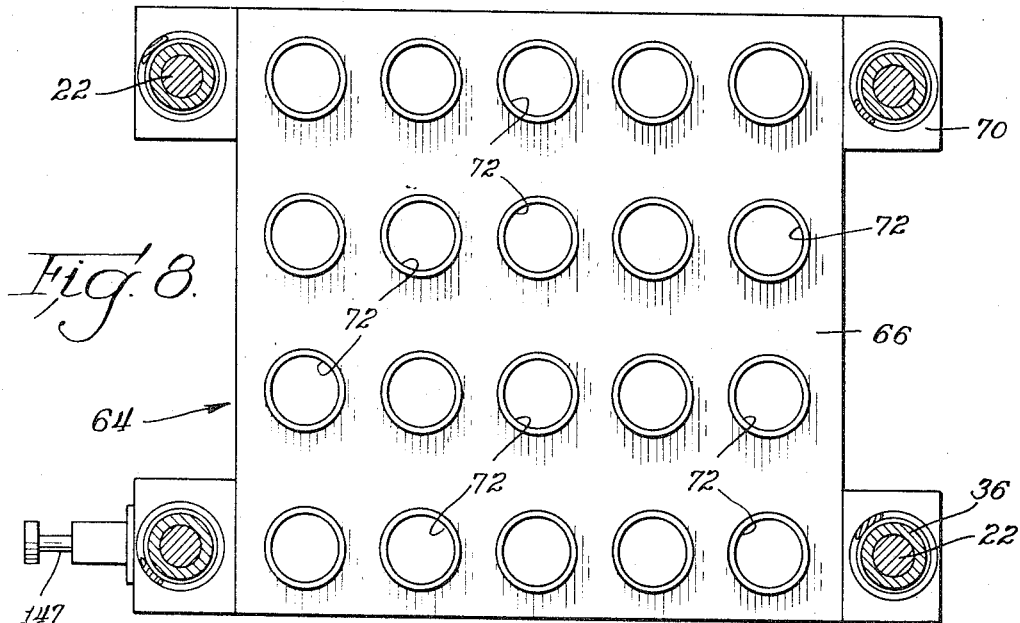
INVENTORS
William Z. Northrup
Jose d'Rugama
Dominik, Stein & Knechtel
attys.

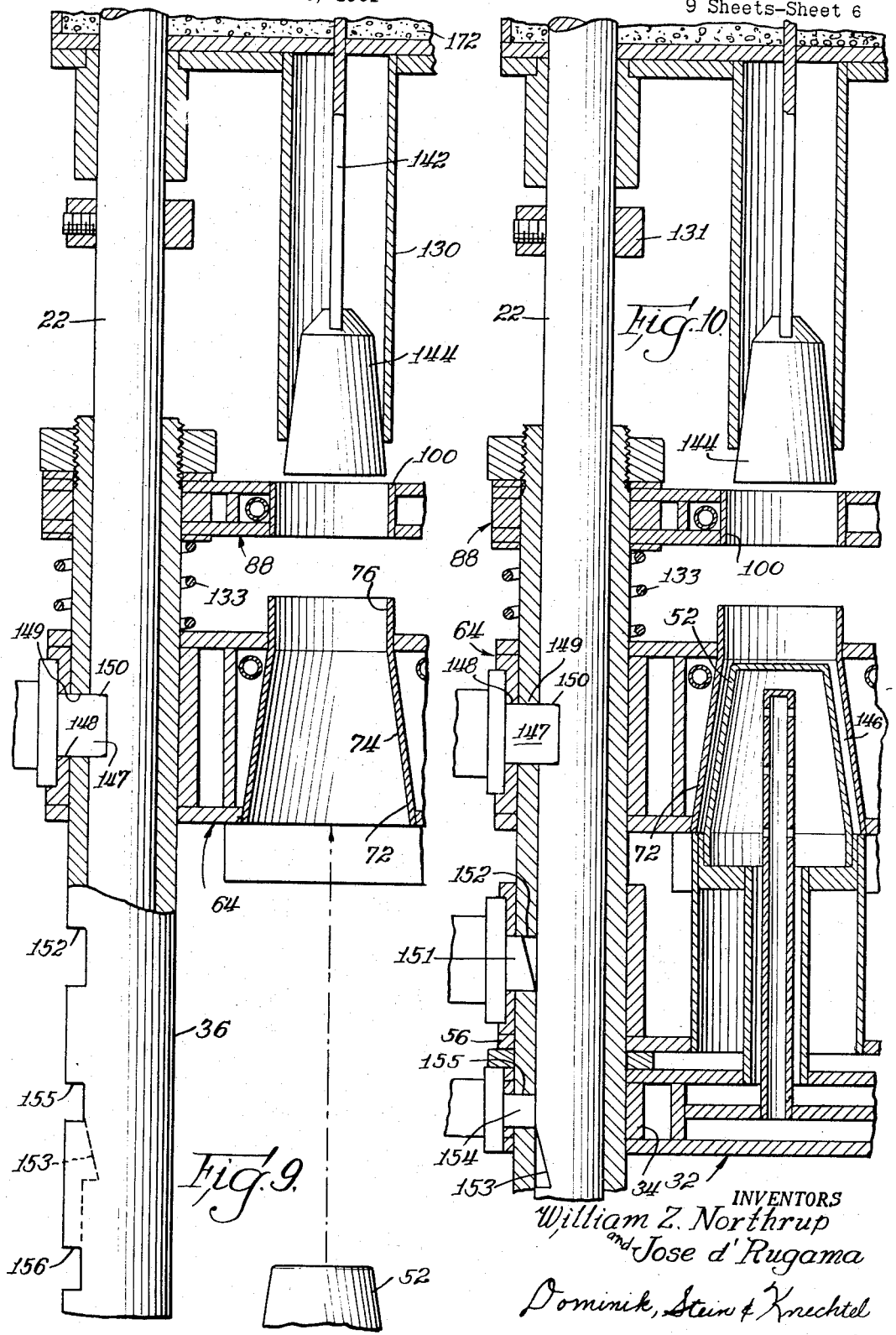

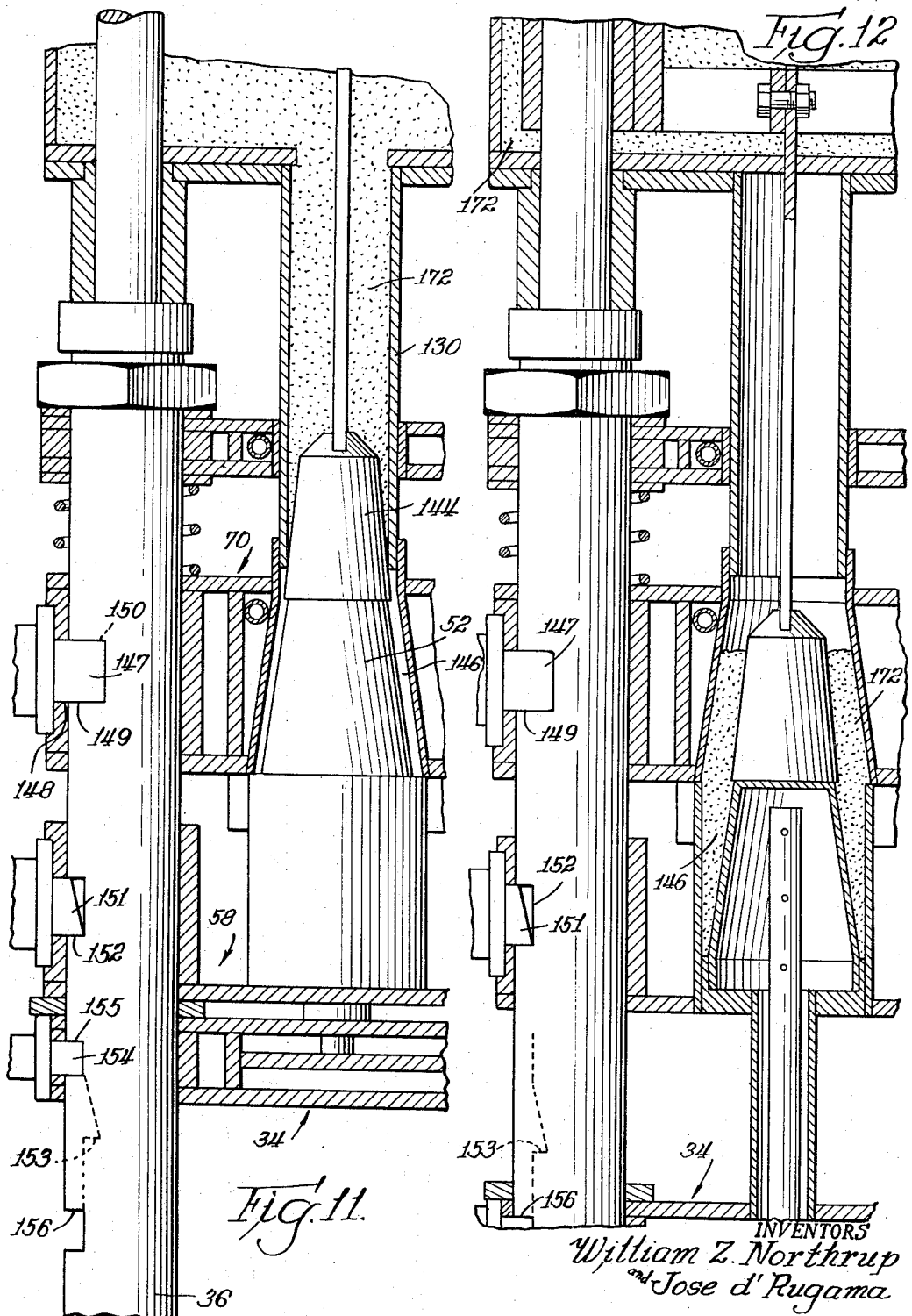

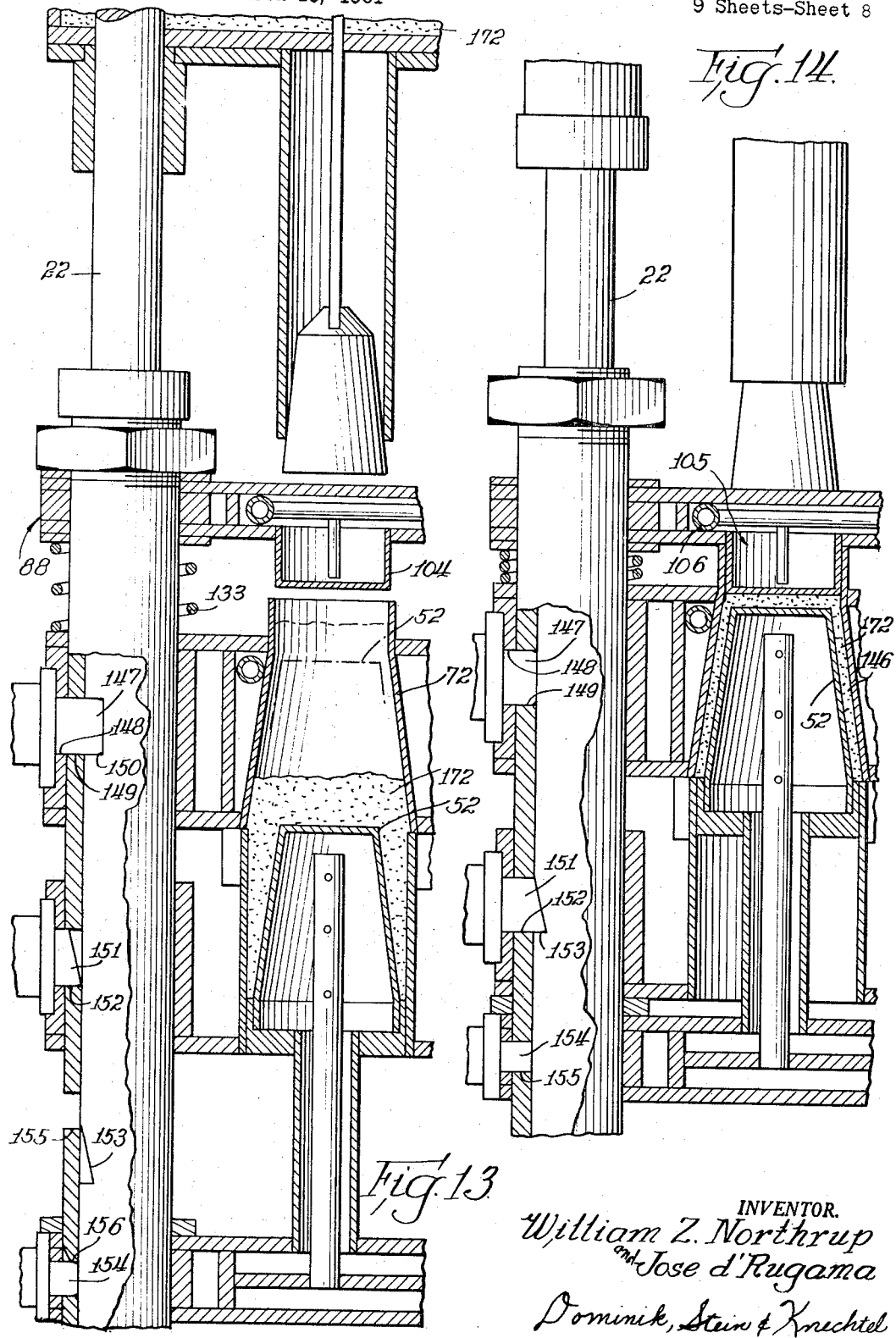

Sept. 19, 1967  W. Z. NORTHRUP ET AL  3,342,912
METHOD OF MOLDING PLASTIC CONTAINERS
Original Filed March 13, 1961  9 Sheets-Sheet 9
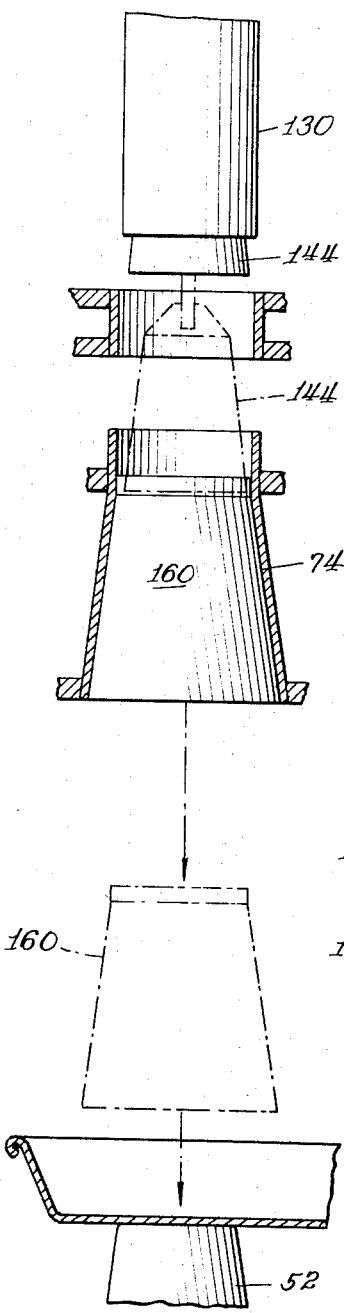
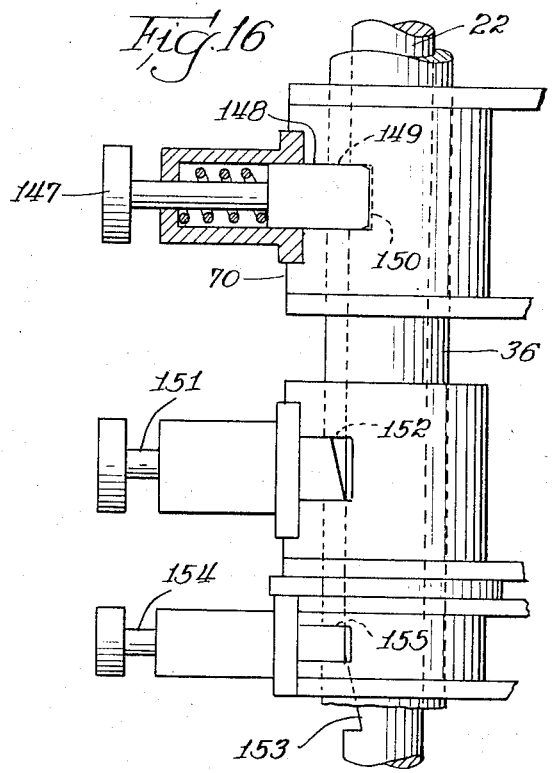
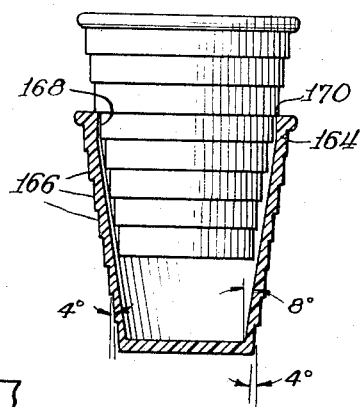
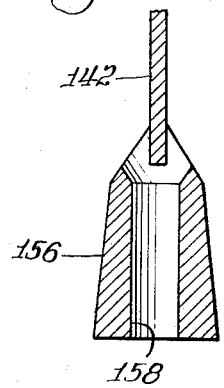
INVENTORS
William Z. Northrup
and Jose d'Rugama
Dominik, Stein & Knechtel
Attys.

3,342,912
METHOD OF MOLDING PLASTIC CONTAINERS
William Z. Northrup and Jose d'Rugama, Mexico City, Mexico, assignors to The Dow Chemical Company, Midland, Mich., a corporation of Delaware
Original application Mar. 13, 1961, Ser. No. 95,052, now Patent No. 3,158,898, dated Dec. 1, 1964. Divided and this application Mar. 6, 1964, Ser. No. 354,813
3 Claims. (Cl. 264—51)

This is a division of our application Ser. No. 95,052, filed Mar. 13, 1961 and now Patent No. 3,158,898.

This invention relates to the manufacture of plastic containers, and particularly to a method for molding said containers.

The plastic containers under consideration herein are of the type made from plastic foam, such as pre-expanded styrene pellets, or beads. Actually, any thermoplastic resinous material which can be pre-foamed or partially expended may be employed in the practice of the present invention. Such materials may be styrene polymers, such as polystyrene, in essentially linear or cross-linked form. Also polymers and copolymers of ar-methyl styrene or vinyl toluene, the several chloro styrenes (such as mono and dichloro styrene), ar-dimethyl styrene, ar-ethyl styrene and the like, including the various thermoplastic moldable polymers and copolymers of alpha-methyl styrene may be utilized with benefits commensurate to those which are derivable from the use of polystyrene. Often, this may also be the case when other expandable thermoplastic resinous materials well known to the art are employed, including those which may be comprised of polymers and copolymers of methyl methacrylate, such as its homopolymer and the copolymers thereof with vinylidene chloride, thermoplastic polymers and copolymers of vinyl chloride, including homopolymeric vinyl chloride; various thermoplastic, expandable natural and synthetic rubber compositions; thermoplastic expandable ester and ether derivatives of cellulose including cellulose acetate, cellulose propionate, cellulose acetate butyrate, ethyl cellulose and the like, cellulose nitrate and so forth; expandable thermoplastic olefin polymers and copolymers, particularly those from non-aromatic hydrocarbon olefins, such as polyethylene, polypropylene, copolymers of ethylene and propylene and the like; chlorinated polyolefins such as chlorinated polyethylene, etc. The pre-foamed or partially expanded material employed in the practice of the invention must contain an efficient residue of the blowing agent (or the gas generated therefrom) trapped within its cell walls (oftentimes in combination with infused air) to permit further expansion of the material upon application of heat.

Plastic containers and cups made of pre-expanded plastic beads have many desirable characteristics, such as, for example, light weight, high strength, low thermal conductivity, dimensional stability under thermal stress, smooth finish, as well as low unit cost, resulting from high volume production.

Generally, the known processes for production of such plastic cups depend upon re-expansion of pre-expanded beads to provide necessary internal pressure to bind the beads together, and utilize a fixed cavity mold requiring vacuum loading. Such processes require pre-expanded styrene beads of uniformly small size, so that they may be loaded into the relatively narrow fixed cavity mold defining the cup walls and bottom. These limitations not only add to raw material cost, and require relatively expensive molding equipment, but often result in the production of cups of inferior quality because of slight variations in a given molding process.

The method of making plastic cups according to the present invention, represents a significant improvement over the known methods of fabrication of the prior art. More particularly, the plastic cups produced by the present invention, in addition to having the desirable characteristics mentioned above, are of more uniform quality, are of lighter weight, and display certain characteristics associated with good-grade cardboard cups, such as, the cup wall may be creased or folded without breaking, and the cup will not crack, or shatter upon flexing or under impact.

In the process of the present invention, random-size pre-expanded styrene beads up to maximum size commercially manufactured, are utilized. A variable size mold cavity is used which allows a certain degree of precompression before re-expansion of the beads. The variable size mold cavity makes gravity loading feasible, thus avoiding the higher construction and operating costs usually associated with vacuum, or pressure mold filling, as in prior art processes. The use of larger beads produce a cup which is 25% to 33% lighter than a cup of the same size made from small beads, hence, a saving in raw material cost is afforded. The use of random size beads, which are pre-compressed before re-expansion, contribute to the additional desirable characteristics of the plastic cup of the invention, as mentioned above. It may be said that the pre-compression technique associated with the method of the present invention, differs from conventional molding, wherein the material is partially liquefied during compression.

The plastic cups produced by the present invention are further distinguished by a unique design which prevents jamming, or sticking together of the cups when stacked, thereby making the cups especially well suited for use in automatic drink dispensing machines.

A prime object of the invention is to provide an improved method of manufacturing a plastic container made from a pre-expanded thermoplastic foam.

A more specific object of the invention is to manufacture a plastic cup made from pre-expanded styrene beads which may be folded without breaking, and which will not shatter upon flexing or under impact.

Another object is to manufacture a plastic cup made from pre-expanded styrene beads, which cup is appreciably lighter than similar cups known to the trade.

An object of the invention is to provide a method for molding plastic cups from pre-expanded styrene beads wherein substantial savings in raw material, and machine costs may be realized.

A more specific object is to provide a method for molding plastic cups from pre-expanded styrene beads of random size up to maximum size commercially manufactured.

A further object is to manufacture a molded plastic cup which will not jam or stick together when stacked.

These and further objects and features of the invention will become more apparent from the following description and accompanying drawings wherein:

FIG. 1 is a front elevation view of a molding machine for the production of plastic cups according to the invention;

FIG. 2 is a section view of a plurality of plastic cups made in the machine of FIG. 1;

FIG. 3 is an enlarged section view generally as seen along line 3—3 in FIG. 1;

FIG. 4 is a section view generally as seen along line 4—4 in FIG. 3;

Figure 5:
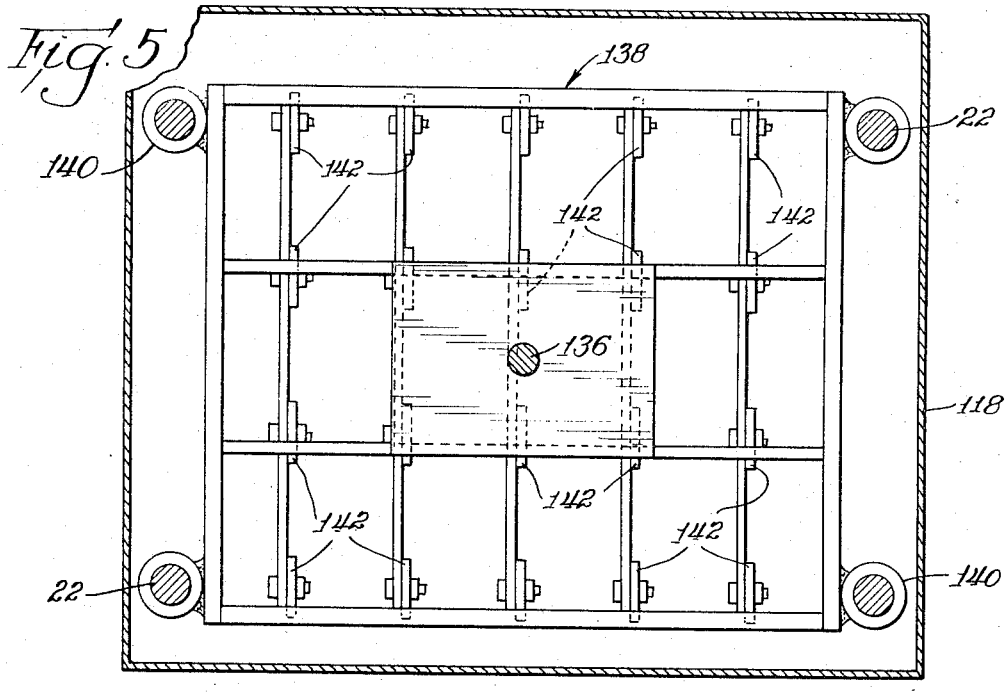

FIGS. 5 to 8 inclusive are section views generally as seen along lines 5—5 to 8—8 respectively in FIG. 4;

FIGS. 9 to 14 inclusive are partial section views similar to FIG. 3, but further enlarged showing a relative position of various parts of the molding machine during certain stages in the molding cycle;

FIG. 15 is a partial section view showing a cup removal operation at completion of a molding cycle;

FIG. 16 is a partial elevation view showing certain details of various parts of the molding machine supra;

FIG. 17 is a partial section view of a modified form of loading cone which may be used in the molding machine supra; and FIG. 18 is a section view of a modified form of plastic cup made in accordance with the present invention.

Referring now to the drawings and more particularly to FIGS. 1 to 8, the numeral 20 identifies a molding machine for performing the method of the invention, which machine includes four vertical supports, or column members 22 which are supported in parallel upright position by a base, or stand 24. A platform means 26 is affixed to the column members 22, a given distance from the base 24, which platform means supports a motor means, such as power cylinder assembly 28, which may be pneumatically operated. Hose, or pipe means (not shown) with appropriate flow control means, are arranged for regulating operation of the power cylinder assembly 28. Included in the power cylinder assembly, is a piston having a piston rod 30 projecting from the upper end, which piston rod is affixed to a lower platen assembly 32, the latter having bushings 34, for sliding engagement upon tubular bushing 36, each of which is slidingly supported upon a respective column member 22. A nut 35, secured to the end of each tubular bushing 36, limits downward movement of the platen assembly 32, while a collar 37 adjustably secured to each column member 22, limits downward movement of each tubular bushing 36.

The lower platen assembly 32, includes an upper plate 38, and a lower plate 40, both plates being generally rectangular and being affixed at the corner areas to the bushings 34. A rectangular center plate 42, is positioned approximately midway between the plates 38 and 40, and is supported in liquid-tight manner about its periphery by a wall member 44. Extending upwardly from the center plate 42 and in parallel relation are a plurality of tubes 46, twenty in number, each of which has a series of holes 48 arranged toward the upper end thereof. Each tube 46 is arranged in spaced relation within a condensate drain tube 50, the lower end being affixed to the upper plate 38, while the upper end of each tube 46 supports a male mold 52, which is hollow and has a frusto-conical exterior suface serving to define the inside wall and bottom of a cup to be molded thereupon. The lower region of each male mold 52 is adapted for sliding movement within an open end cylinder 54, affixed to a generally rectangular cylinder plate 56 which is secured at each of its corner portions to a bushing 58 slidingly supported upon a respective tubular bushing 36.

During one phase of the cup molding cycle, to be described, steam is admitted into a chamber 60 defined between the lower plate 40 and center plate 42, which steam passes upwardly through the tubes 46, and exits through the holes 48 into the male molds 52. The same path is subsequently traversed by cooling water. Both the steam and cooling water are admitted into the chamber 60, by hose, or pipe means (not shown) having suitable flow control valves. It will be seen that any liquid within the male molds 52 will pass through the drain tubes 50 and into a condensate chamber 62 defined between the upper plate 38 and the center plate 42, from where it is drained by suitable hose, or pipe means, (not shown).

An intermediate platen assembly 64, positioned above the lower platen assembly 32, includes an upper plate 66 and a lower plate 68, both plates being generally rectangular and being affixed at each corner area to a bushing 70 adjustably secured to a respective tubular bushing 36 by set screw means 71. Supported by the upper and lower plates 66 and 68 respectively, are a plurality of vertically arranged female molds 72, of like number and in axial alignment with the male molds 52. The female molds 72 are open at both ends, and have an interior surface defined by a frusto-conical portion 74, with a cylindrical portion 76 toward the upper end. A vertical wall 78 surrounds the female molds 72, which wall is secured in liquid-tight manner to the inside surfaces of the upper and lower plates 66 and 68. A chamber 80, defined between the outside surfaces of the female molds 72, the inner surfaces of the upper and lower plates 66 and 68, as well as the inside surfaces of the wall 78, is adapted to sequentially receive heating and cooling medium as required during a molding cycle via a pipe means 82 within the chamber 80, which pipe means is serviced by hose or pipe means (not shown). Extending along and affixed to the bottom of the lower plate 68, are condensate ducts 84 arranged to conduct liquid flowing from the chamber 80 via holes 86 into suitable hose, or pipe means (not shown).

An upper platen assembly 88, positioned above the intermediate platen assembly 64, includes an upper plate 90 and a lower plate 92, both plates being generally rectangular and being affixed at each corner area to a bushing 94. The latter has an elongated slot 96, the width of which is slightly larger than the outer diameter of a tubular bushing 36, for sliding movement in both vertical and horizontal directions upon the bushing 36. The upper and lower plates 90 and 92 are maintained in spaced relation by a wall means 98, which extends around the edge region of the plates and to which the plates are secured in liquid-tight manner. Supported by the upper and lower plates 90 and 92, are a plurality of bushings 100, fifteen in number, which are arranged for axial alignment with a like number of female molds 72, when the platen assembly 88 is moved to full forward horizontal position upon the tubular bushings 36, as indicated in broken lines in FIG. 3. A handle means 103 may be affixed to the front edge of the platen assembly 88, to facilitate manual horizontal positioning thereof as required. Affixed in liquid-tight manner to openings 102, formed in the lower plate 92, and in alternate spaced relation to the bushings 100 as best seen in FIG. 7, are a plurality of molding heads, or pots 104, of like number, namely, twenty, and in axial alignment with the female molds 72, when the platen assembly 88 is moved to full rearward horizontal position, as indicated in full lines in FIG. 3. A chamber 105, defined between the outside surfaces of the bushings 100, the inner surface of the upper and lower plates 90 and 92, as well as the inside surface of the wall 98, is adapted to sequentially receive heating and cooling medium, as required during a molding cycle, via a pipe means 106 within the chamber 105, which pipe means is serviced by a hose, or pipe means (not shown). A duct means 108 is arranged to interconnect the interior of each pot 104, while a condensate blowout pipe 110 is arranged in each pot, one end of the pipe 110 terminating a short distance above the inside bottom surface of the pot, while the other end of the pipe is connected to the duct means 108, as seen in FIG. 3.

Figure 6:
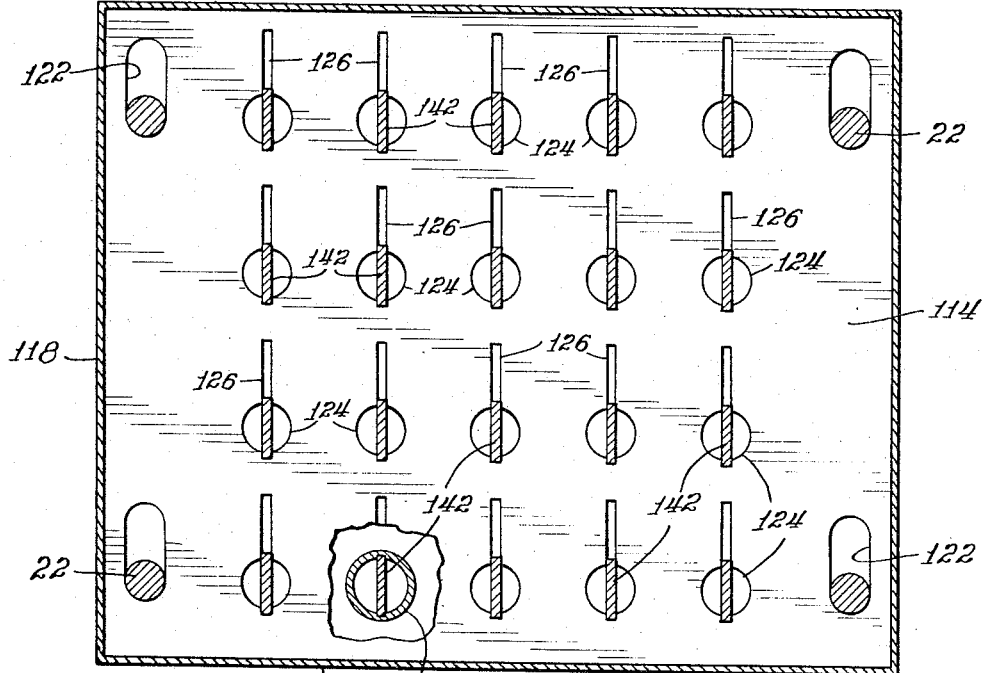

A material bin assemblage 112, positioned above the upper platen assembly 88, includes a base plate 114, and a loading tube base plate 116, both plates being co-extensive and generally rectangular. Side pieces 118 are affixed to the plate 114 to form an open top box or bin 120, having a handle 121. The plate 116 is supported upon the column members 22, while the plate 114 is supported by the plate 116. Elongated holes 122 are formed in the plate 114, which holes have a width slightly larger than the diameter of the column members 22 whereby the bin may be moved horizontally as indicated in FIG. 3. A plurality of holes 124, specifically twenty in number, are formed in the plate 114, each of said holes being connected with a slot 126, all of said slots 126 extending in the same direction and being parallel with the major axis of each elongated hole 122, as best seen in FIG. 6. A plurality of holes 128 of like number and spacial arrangement as holes 124, are formed in the base plate 116. Affixed within each hole 128, and extending downwardly from the plate 116, is a cylindrical loading tube 130, the outer diameter of which is adapted for sliding engagement within a cylindrical portion 76 of a female mold 72.

An adjustable stop collar 131 is mounted upon each column member 22 above the upper platen assembly 88, while a helical spring 133 is positioned on each column member between the intermediate platen assembly 64 and upper platen assembly 88.

Affixed to the upper ends of the column members 22, is a platform 132 which supports a motor means, such as power cylinder assembly 134, which may be pneumatically operated, Hose, or pipe means (not shown) with appropriate flow control means, are arranged for regulating operation of the power cylinder assembly 134. Included in the power cylinder assembly is a piston having a piston rod 136, projecting from the lower end, which piston rod is affixed to a rectangular hanger frame assembly 138, the latter has a bushing 140 affixed near each corner for sliding upon a column member 22, as best seen in FIG. 5.

Hanger elements, in the form of flat rods, or straps 142, of like number and spacial arrangement as the holes 128 of the loading tube base plate 116, are affixed at the upper ends to the frame assembly 138, and extend downwardly through the base plate holes 124 and into the loading tubes 130. The width of each strap 142 is such as to provide a sliding fit with a slot 126 of the hole 124 through which the strap passes. Affixed to the lower end of each strap is a loading cone 144, which has a frusto-conical exterior shape, the larger end thereof having a diameter greater than the inside diameter of a loading tube 130, so that the loading cone will provide a tight enclosure for the end of the loading tube when pulled upwardly, as seen in FIG. 3. Movement of the loading cones 144 relative to the loading tubes 130, is, of course, controlled by operation of the power cylinder assembly 134.

During a molding cycle, it is necessary to lock the platen assemblies 32, 64, 88, and cylinder plate 56, against movement. For such purpose, a pin 147 is arranged to extend through an opening 149 formed in bushing 36, and into a notch 150, formed in a column member 22; a pin 151 is arranged in bushing 58 to extend into a notch 152 formed in bushing 36 and to project into a notch 153 formed in a column member 22; and a pin 154 is arranged in bushing 34 to extend into notches 155 and 156 formed in bushing 36.

In FIG. 17, a modified form of loading cone 157 is illustrated, which differs from the loading cone 144, only in that a passageway, or core 158, is provided, which serves as an additional reservoir for beads discharged unto the tops of the male molds 52 when the male molds and loading cones are separated, as will later be more apparent.

FIG. 2 illustrates a cup 160 which may be molded by the apparatus above described. It will be noted that an exterior wall portion 162, at the lower end of the cup, is generally cylindrical, thus providing an edge which serves to keep the walls of the cups in spaced relation when stacked as illustrated. Such an arrangement reduces the possibility of the cups jamming or sticking together when stacked.

In FIG. 18, a modified form of cup 164 is illustrated which may be made by the apparatus above described with slight modification of the walls of the mold cavities. The cup 164 has a series of side, reduced diameter portions 166 tapering at an angle of approximately 4° forming an exterior wall surface, which portions extend the full height of the cup. The inside wall surface of the cup 164 is smooth and tapers at an angle of approximately 8° from the bottom of the cup to a point a short distance from the top edge, which remaining wall portion 168 is vertically straight, forming a sharp or square edge 170. In a stack, each cup supports the one above, with the square edge 170 receiving a bottom edge, or ledge of reduced diameter portion 166. It will be noted that the wall portion 168 prevents the cups from touching at any point below the square edge 170, since the external diameter of the reduced diameter portions 166, is less than the internal diameter of the adjacent cup wall portion. In such manner, jamming or sticking together of the stacked cups 164, is positively avoided.

A molding cycle for production of cups according to the method of the invention will now be described. Assume that the bin 120 contains a supply of partially pre-expanded styrene beads 172, and that the various movable elements of the machine are in the position illustrated in FIG. 9. In such position, the upper platen assembly 88 is in full forward position so that the holes 100 are in axial alignment with respective loading tubes 130. The lower cylinder assembly 28 is activated to cause upward movement of the lower platen assembly 32, which results in simultaneous upward movement of the cylinder plate 56 and cylinders 54. Such movement continues and soon the upper edge of the cylinders 54 will engage the lower edge of the female molds 72. In such position, as illustrated in FIG. 10, each male mold 52 will be positioned within a female mold 72, thus providing a conical cavity 146 which will subsequently be filled with beads to form the side walls of a molded cup. Upon arriving at such position, a bushing 34 will be spring locked to a tubular bushing 36. Although pin 151 will enter notch 153, the tapered end of the pin and the matching tapered end of the notch 153, will provide automatic disengagement as upward movement of the pin 151 takes place. Upward movement will continue causing lifting movement of the intermediate platen assembly 64. Since the bushings 70 of intermediate platen assembly 64 are affixed to the tubular bushings 36, upward movement of the platen assembly 64 will result in simultaneous upward movement of the tubular bushings 36. The upper platen assembly 88 will likewise be moved upwardly by reason of the flexible connection with platen assembly 64 provided by springs 133. The end of each tubular bushing 36 will soon engage a stop collar 131, and at this stage a tubular bushing 36 will be spring locked to a column member 22 by the pin 147 engaging the notch 150. Power supply to the cylinder assembly 28 is cut off at this point, thus terminating upward movement as described. Upon completion of such upward movement, the lower ends of the loading tubes 130 will project slightly within the cylindrical portion 76 of the female cavities 72, while the loading cones 144 will be seated upon the top surface of axially aligned male molds 52.

The loading bin is next pulled forward so that the loading bin holes 124 will be moved into alignment with the holes 128 of the base plate 116, whereupon beads will flow by gravity from the bin 120 into the loading tubes 130. Since the loading cones 144 are enclosing the lower ends of the loading tubes 130, each tube will be filled with a supply of beads in an amount as required for the formation of a molded cup, as best seen in FIG. 11. The material bin 120 is then moved back to the original position, thus shutting off the bin contents from each loading tube.

Next, the cylinder assembly 134 is activated to cause downward movement of the frame assembly 138 and the loading cones 144. Simultaneously, pressure in the lower air cylinder 28 is reduced, allowing the loading cones 144 to depress the male molds 52 causing downward movement of said molds in the cylinders 54 until the pin 154 enters a notch 156. Since the end of pin 154 as well as the upper edge of notch 156 have complementary tapers, automatic disengagement of the pin from the notch will occur as upward movement of the pin later takes place.

Prior to downward movement of the male molds 52, the bushing 34 must be unlatched from the tubular bushing 36. As seen in FIG. 12, downward movement of the loading cones 144 and male molds 52, not only enlarges the cavities 146 defined between the male and female molds, but unlocks the lower end of each loading tube 130, allowing flow of beads 172 from each loading tube into a respective enlarged cavity.

The upper cylinder 134 is next deactivated, and the lower cylinder 28 activated, causing upward movement of platen assemblage 32, and associated male molds 52. Such upward movement of the male molds 52 results in the lifting of the loading cones 144 to the position generally as shown in FIG. 11, and effects a precompression of the beads 172. In such position, a lower platen assembly bushing 34 is again spring locked to a tubular bushing 36 by the pin 154 entering notch 155.

It may be mentioned that an important function of the loading cones 144, is to elongate the conical shape of each male mold 52, thus facilitating distribution of the beads around the mold rather than permitting them to pile up on the flat upper surface of the male mold. The loading cones also provide a continuous lateral surface to slide against the beads, thus avoiding dislodgment or disarrangement of the beads during movement of the male molds and loading cones.

The tubular bushings 36 are next unlocked from the guide posts and moved downwardly by gravity until the position of various parts, as shown in FIG. 10, is realized. In such position, the tubular bushing 36 is locked to the column member 22 by pin 151, while the bushing 32 is locked to the tubular bushing 36 by pin 154.

The upper platen assembly 88 is then moved rearwardly so that each pot 104 will be in axial alignment with a respective female mold, as seen in FIG. 13. The upper cylinder assembly 134 is activated so that the loading cones 144 will force the platen assembly 88 downwardly, whereby the pots 104 will be moved into the upper ends of the female die 72 to compress the beads 172 within the mold cavities 146 into molded cup shape, as seen in FIG. 14. Springs 133 will be compressed during such downward movement of the platen assembly 88.

Next, the condensate chamber 62, of the lower platen assembly 32, as well as the condensate ducts 84 of the platen assembly 64, are closed and steam is admitted to the pots 104 of the upper platen assembly 88, to drive the condensate therefrom via the condensate blowout pipes 110, following which the pipes are closed. Steam is then admitted to the interior of the male molds 52, as well as to the chamber 80 of the platen assembly 64.

After a predetermined time as is necessary for complete fusion of the beads in the mold cavities 146, depending upon the characteristics of the beads being used, as well as cup size, and mold temperature, the steam is shut off and cooling water is admitted to the volumes formerly occupied by steam. When the molded cups are cooled sufficiently, the water is shut off, and the platen assembly 32 and cylinder plate 56 are moved downwardly so that the male molds 52 are clear of the female dies, as best seen in FIG. 15. The springs 133 will simultaneously expand to lift the platen 88 so that the pots 104 are clear of the upper ends of the female molds 72. The platen 80 is then pulled forward so that the bushings 100 are again in axial alignment with the female molds 72. A tray 180 is placed below the female molds and the upper cylinder 134 is activated so that the loading cones 144 will move downward to force the molded cups from the female molds, unto the tray 180. After removal of the tray, the machine 20 is in readiness for another molding cycle, as described above.

It may be mentioned that means other than steam may be used for heating the mold cavity, such as that obtained by electrical, or other types of energy sources. Furthermore, while the machine 20 is illustrated for manual operation of the various control valves, and latching means, it would be relatively easy for those skilled in the art to provide for a completely automatic operating machine, which would perform a complete molding cycle according to the method of the invention.

The foregoing description has been given in detail without thought of limitation since the inventive principles involved are capable of assuming other forms without departing from the spirit of the invention or the scope of the following claims.

What is claimed is:

1. A method for fabricating cups from partially pre-expanded thermoplastic material and employing a variable volume mold cavity including a female mold, a male mold positionable in the female mold to form a cup mold cavity, a loading tube projectible within the female mold, a loading cone enclosing the lower end of said loading tube and engageable with the top of the male mold, said loading tube containing pre-expanded thermoplastic material sufficient for the formation of a cup, and a molding head, comprising the steps of moving the male mold into the female mold, projecting the loading tube while the loading cone blocks the lower end thereof partially into the female mold to engage the loading cone with the top of the male mold, then moving the loading cone and the male mold to open the lower end of the loading tube, to enlarge the volume of the cup mold cavity and to deposit said pre-expanded thermoplastic material in said enlarged volume, moving the loading tube and loading cone out of the female mold, inserting said molding head in the female mold, moving the male mold toward said molding head to compress said pre-expanded thermoplastic material, heating the compressed material to cause fusing thereof, cooling the fused material and removing a cup thus formed from the molds.

2. The method of claim 1 wherein said loading cone acts to evenly distribute said pre-expanded thermoplastic material about said cup mold cavity during deposition in said enlarged volume.

3. The method of claim 1 wherein said female mold has a cylindrical configuration corresponding with the base of the cup to be fabricated and said molding head inserts only partially into said cylindrical configuration of said female mold to effect a cylindrical base on said cup.

References Cited

UNITED STATES PATENTS

| | | | |
|---|---|---|---|
| 3,045,286 | 7/1962 | Harrison | 264—321 |
| 3,082,483 | 3/1963 | Bickford | 264—321 |
| 3,085,730 | 4/1963 | Fibish | 229—1.5 |
| 3,118,176 | 1/1964 | Freedman et al. | 264—53 XR |
| 3,141,595 | 7/1964 | Edwards | 229—1.5 |
| 3,178,491 | 4/1965 | Dart | 264—53 |
| 3,200,175 | 8/1965 | Harrison | 264—53 |

ALEXANDER H. BRODMERKEL, *Primary Examiner.*

GEORGE O. RALSTON, *Examiner.*

P. E. ANDERSON, *Assistant Examiner.*